United States Patent [19]

Wiegand, Jr. et al.

[11] 4,019,383
[45] Apr. 26, 1977

[54] FOUR-COLLECTOR FLUX SENSOR

[75] Inventors: Walter J. Wiegand, Jr., Glastonbury; Robert H. Bullis, Avon, both of Conn.; Robert J. Mongeon, East Longmeadow, Mass.

[73] Assignee: United Technologies Corporation, Hartford, Conn.

[22] Filed: July 21, 1976

[21] Appl. No.: 707,174

[52] U.S. Cl. ............................... 73/194 F; 324/33
[51] Int. Cl.² ......................................... G01F 1/64
[58] Field of Search ............: 73/194 F, 194 E, 181; 324/33

[56] References Cited

UNITED STATES PATENTS

| | | | |
|---|---|---|---|
| 3,470,741 | 10/1969 | Durbin | 73/181 |
| 3,706,938 | 12/1972 | Petriw | 324/33 |
| 3,750,469 | 8/1973 | Storey | 73/194 F |

Primary Examiner—James J. Gill
Attorney, Agent, or Firm—Anthony J. Criso

[57] ABSTRACT

A sensor for measuring the flux of a gas and some simple alternate embodiments are disclosed. The sensor employs charged particle techniques and includes provision for compensating for environmentally produced changes in the charged particle source. The basic device includes an active region containing the charged particle source located between two upstream charged particle collectors and two downstream charged particle collectors, means for maintaining suitable electric fields between the charged particle source and the collectors, and means for measuring the electric current flowing in each collector. In operation, the sensor is able to compensate for changes in the charged particle source characteristics which would otherwise result in a change of sensor calibration.

14 Claims, 4 Drawing Figures

FOUR-COLLECTOR FLUX SENSOR

BACKGROUND OF THE INVENTION

1. Field of Invention

The present invention relates to the measurement of fluid parameters and more particularly to quantitizing the rate of fluid motion through a given cross sectional area.

2. Description of the Prior Art

Many different types of meters and gauges employing charged particle techniques for measuring the flow of fluid are described in the technical literature and applicable patents. Frequently, charged particle techniques are employed to obtain a qualitative determination of flow field characteristics such as direction and/or velocity, however, few deal directly with the problem of mass flow measurement.

In U.S. Pat. No. 3,470,741, Mass Flow Apparatus, E. J. Durbin, discloses a device consisting of a duct having a source of ionization on the flow axis, and ion collection means located on the inner surface of the duct and means for providing an electric field transverse to the direction of flow through the duct. By sensing the downstream deflection of the ions due to the movement of the fluid in the axial direction, the flow characteristics of the fluid in the duct are determined. The essence of the Durbin disclosure involves maintaining an electric field transverse to the direction of fluid flow and measuring the physical displacement along the flow axis experienced by an ion group of known distribution due to the motion of the fluid through the duct.

A similar and related device is disclosed in Ionization Type Flow Meter, U.S. Pat. No. 3,750,469 issued to O. Storey. The invention is essentially a modified Durbin type meter which circumvents the necessity for locating the exact position at which the medium ion in the ion distribution is intercepted on the collector electrode. Although similar to Durbin, the Storey device includes further a split collector wherein the separation between the two collector members extends obliquely to the direction of the fluid flow. The Storey device contains little by way of additional disclosure in its description which relates to a velocity meter having an electric field transverse to the direction of flow and a split collector having a gap which extends in a generally oblique direction with respect to the direction of flow and is positioned symmetrically about a projection of the ion production means.

A more qualitative type meter designed to determine wind velocity and direction is disclosed in U.S. Pat. No. 3,706,938, Directional Ion Anemometer, issued to Andrew Petriw. This device is designed to overcome the shortcomings of related anemometers such as hot wires and propellers and employs a nuclear source of ionization located between two collector electrodes of opposite polarity in a balanced electric field. The device is designed to measure flow velocity and direction and has an electric field coincident in direction with the flow direction. Ionization of the air is produced somewhat uniformly throughout the volume between the grids and the introduction of flow alters the ionization cloud between the grids, thereby providing a means for determining wind direction and velocity.

Method and Apparatus For Sensing The Flux Of A Flowing Fluid, U.S. Pat. application Ser. No. 599,560 filed on July 28, 1975 and held together with the present invention by a common assignee is a substantial improvement in the art represented by the patents discussed. The term flux as used in the title of the patent as well as herein is a parameter which describes the number of particles per second passing across a plane and is defined as:

$$\text{Flux} = N v_o A$$

where

N is the particle density of the fluid (number of particles per cubic centimeter), $v_o$ is the average velocity of the fluid through the duct (centimeters per second), and A is the cross sectional area of the duct (square centimeters).

Multiplication of the value of flux which is in particles per second by the average mass (grams per particle) converts the quantity flux into mass flow which is measured in grams per second. The flux sensor allows the flux or mass flow of a fluid passing through a duct to be determined directly. This system employs a central ion source means, electric fields which are coaxial with the direction of fluid flow, upstream and downstream charged particle collection means to eliminate through symmetry gross changes in ion source emission characteristics, and other normally occurring perturbations which unfavorably influence meter calibration. The ionization production is confined to the charge particle source means which is a very narrow region extending across the duct and is located symmetrically between the upstream and downstream collection means. Only one type of charged particle with known polarity is employed in the determination of flow field properties in contrast to the technique of the Petriw device thereby eliminating the difficulty associated with dealing with charged particles of different species and charge which may have significantly different mobility. Further, the presence of a duct makes possible a clearly defined area through which the flow passes thereby permitting quantitative measurement of flow properties. The application of a coaxial electric field between the charged particle source means and the symmetrically positioned upstream and downstream collection means produces charged particle flows corresponding to electric currents which are simply related to the flux or mass flow of fluid through the duct.

While various seemingly similar devices of the prior art were touted as mass flow sensors, many were simply velocity meters. The flux sensor identified above is the first true flux sensor having an axially extending electric field which allows measurement of the upstream and downstream electric currents and in turn the determination of either flux or mass flow. The suitably processed currents from the collection means provide an output which has been shown to be linearly proportional to flux and independent of both temperature and pressure of the fluid. This device eliminates the influence of such factors as gross perturbations in the flow field properties and charged particle source characteristics by symmetrical location of the upstream and downstream collector means. Nonsymmetrical effects such as changing charge particle emission characteristics in the upstream and downstream directions due, for example, to preferential oxidation on the upstream side of a corona source structure can occur and result in calibration shifts. Such phenomena lead to changes in the density of the charged particles in the regions immediately adjacent to the charged particle source means and consequently the meter zero calibration changes although there is no effect on the incremental rate of change of the meter output as a function of the flow rate of the fluid. Such calibration shifts are highly undesirable in many applications, such as those requiring high accuracy or long term remote operation.

SUMMARY OF THE INVENTION

An object of the present invention is to measure the rate of fluid flow using ion drift techniques.

Another object is to devise an ion drift device which detects and compensates for changes in the source producing the ions.

According to the present invention, a flow meter is constructed in a region having two ion collectors positioned on each side of a centrally located ion source with means external to the region for providing appropriate voltages to the collectors and means for sensing electric current in each collector; the four collectors and the ion source are essentially perpendicular to a central axis through the region. When a fluid such as air flows axially through the region in which ions are produced and appropriate electric fields are maintained between the collector positions, an electric current flows to each collector due to the net motion of the ions in the moving air, some of the ions being assisted and some impeded by the velocity of the fluid. The electric currents and voltages and various parameters which define the fluid and the flow region are combined in an appropriate electric circuit in a manner which allows the flux of the fluid to be determined.

One of the features of the present invention is the ion source means which is substantially planar, perpendicular to the direction of flow of the fluid passing through the device and maintained at a positive potential. A total of four ion collectors, two of which are positioned on each side of the ion source, is used with the two collectors immediately adjacent to the ion source being maintained at a positive voltage and the two remaining collectors being maintained essentially at ground potential. The precise arrangement of the electrical connection of the ion collectors can be varied. The current output from each of the collectors is related to the ion density in the several regions and to the flux of the fluid passing through the device, and through suitable processing of the collector currents in a critical manner, problems associated with the shift of the meter calibration are essentially eliminated. The use of four collector currents circumvents the difficulties in relating fluid flow rate to the measured currents when compensation is required for nonsymmetrical effects such as the effect of oxidation and aging on the structure particularly in a corona ion source and allows greater accuracy particularly under conditions of low velocity of fluid flow.

The foregoing and other objects, features and advantages of the present invention will become more apparent in the light of the following detailed description of preferred embodiments thereof as shown in the accompanying drawing.

DESCRIPTION OF A PREFERRED EMBODIMENT

The present invention teaches the measurement of flow rate of a gas using an ion source located centrally between four ion current collectors. With such a configuration the invention can account for time varying effects on the ion source including oxidation, aging and the presence of foreign material by explicitly considering the pertinent ion densities in the regions between the collectors in terms of the collector currents and using these currents to eliminate any explicit ion density terms in the analytical equations which describe the gas flow.

Figure 1:
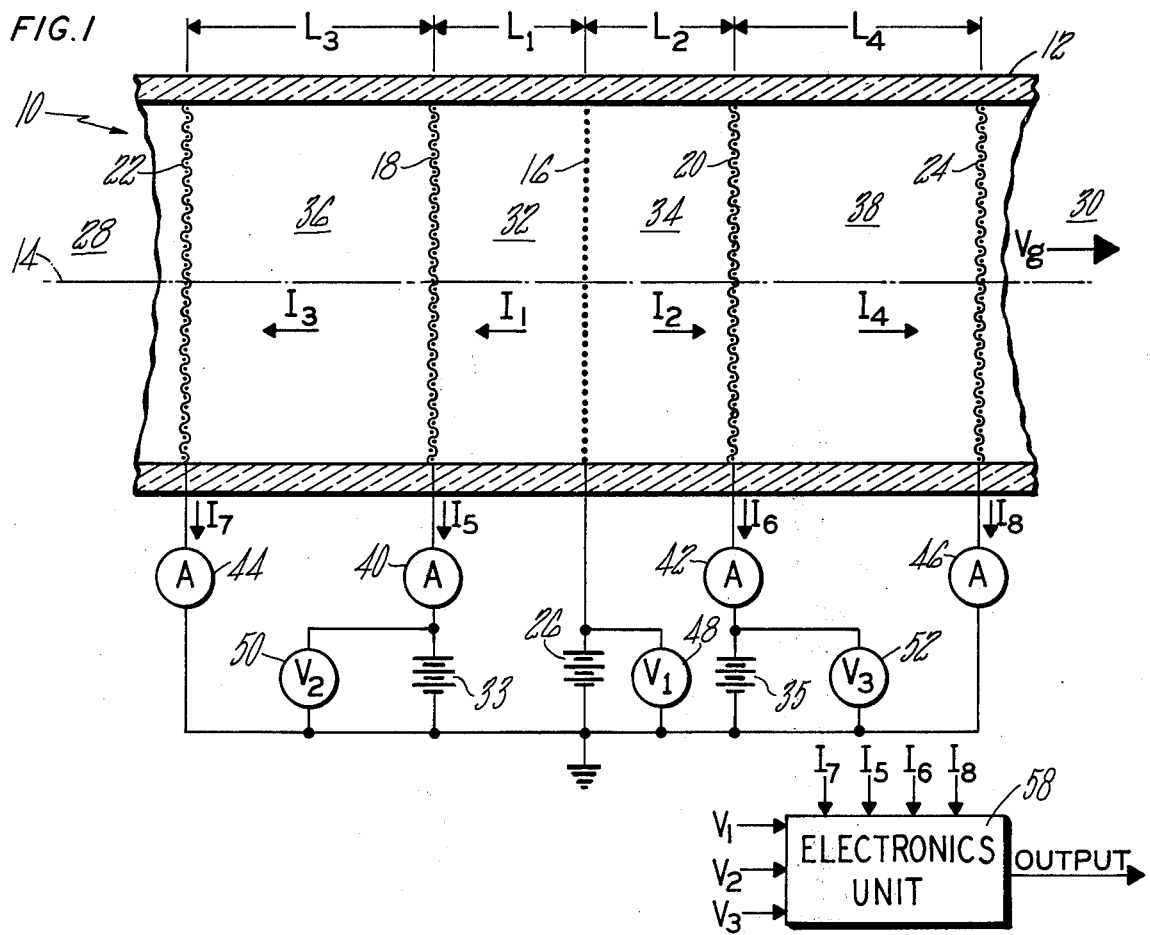
FIG. 1 is a simplified schematic through the cross section of an apparatus in accordance with the present invention.

A flux sensor 10 having an ion source and four ion collectors is shown schematically in cross section in FIG. 1. The sensor comprises a circular duct 12 having a cross sectional area A and a centerline axis 14. A wire array 16 of fine parallel wires which can provide ions to the surrounding medium immediately adjacent to the wire by corona action extends completely across the duct and is essentially perpendicular to the centerline axis. The array is sandwiched between a first collector 18 and a second collector 20 which are spaced apart from the wires 16 by the distances $L_1$ and $L_2$, respectively, and extend essentially perpendicular to the axis over the entire cross sectional area A. Similarly, a third collector 22 separated from the first collector by a distance $L_3$ and a fourth collector 24 separated from the second collector by a distance $L_4$ extend across the duct. A first power source 26 is connected to the wire array and ammeters are connected in electrical series with the four collectors.

The sensor is operable whether or not the gas inside the duct is in motion although in order to discuss its operation the gas is assumed to be air which moves in the direction parallel to the centerline axis at a velocity $v_g$ from an upstream location 28 to a downstream location 30. The application of a suitable potential of several kilovolts to the wire array creates ions in the air by corona action in portions of an upstream region 32 and a downstream region 34 which are immediately adjacent to the wires 16. Further an electric potential of the same polarity and intermediate that of the wire array and ground potential is applied to the first and second collectors with a second power source 33 and a third power source 35. These potentials create electric fields between the wire array and the first and second collectors causing the ions to migrate upstream toward the first collector forming an upstream ion current $I_1$ and downstream toward the second collector forming a downstream ion current $I_2$. A fraction of the ions from regions 32, 34 pass through the permeable first and second collectors and come under the influence of the electric fields which are maintained between the third and fourth collectors at ground potential and the first and second collectors at an intermediate potential forming a lesser upstream ion current $I_3$ in a far upstream region 36 and a lesser downstream ion current $I_4$ in a far downstream region 38. The movement of the ions across the upstream regions 32, 36 induces a first collector current $I_5$ which passes through a first ammeter 40. Similarly, the movement of the ions across the downstream regions 34, 38 induces a second collector ion current $I_6$ which passes through a second ammeter 42. In an analogous manner, the ions collected on the third and fourth collectors form a third collector ion current $I_7$ and a fourth collector current $I_8$, respectively, which pass through a third ammeter 44 and a fourth ammeter 46, respectively.

The determination of the flux of a fluid passing through the sensor shown in FIG. 1 involves essentially the critical processing of the first, second, third and fourth collector currents, $I_5$, $I_6$, $I_7$, $I_8$ and the voltages $V_1$, $V_2$, and $V_3$ which are determined from voltmeters 48, 50 and 52. When the wire array 16 is raised to a suitable positive electric potential, corona forms immediately adjacent to each wire of the array, creating ions in both the upstream region 32 and the downstream region 34. The second and third power sources cause the first and second collectors to assume intermediate positive electric potentials which are sufficient to establish suitable electric fields between these collectors and the wire array. These electric fields cause the positive ions in the regions 32, 34 to migrate toward the collectors as the upstream ion current $I_1$ and the downstream ion current $I_2$. Some of the ions pass through the first and second collectors forming the lesser upstream ion current $I_3$ and the lesser downstream ion current $I_4$ and migrate respectively across the far upstream region 36 and the far downstream region 38. The ions passing through the far regions 36, 38 are intercepted by the third and fourth collectors respectively, forming the third collector current $I_7$ and the fourth collector current $I_8$. Typically, the electric field across each of the far regions 36, 38 is less intense than the electric field extending across the regions 32, 34, immediately adjacent to the wire array, causing the lesser ion currents $I_3$ and $I_4$ to experience a greater influence due to the velocity of the air $v_a$ flowing along the centerline than do the currents $I_1$ and $I_2$.

The ion currents are related algebraically according to the equations $$I_1 = q\, n_{32}\, A\, (v_{32} - v_a) \tag{1}$$

$$I_2 = q\, n_{34}\, A\, (v_{34} + v_a) \tag{2}$$

$$I_3 = q\, n_{36}\, A\, (v_{36} - v_a) \tag{3}$$

and $$I_4 = q\, n_{38}\, A\, (v_{38} + v_a) \tag{4}$$

where with reference to FIG. 1

$q$ is the electronic charge of the ions (coulombs), $n_{xx}$ is the ion density in the indicated region (particles/cm$^3$), $A$ is the cross sectional area of the duct (cm$^2$), and $v_{xx}$ is the drift velocity of the ions (cm/sec).

The drift velocity $v_{xx}$ is related to the applied electric field E in the indicated region by a proportionality factor $\mu$ called the ion mobility. Thus $$v_{32} = (\mu E_{32}) = \left( \frac{\mu_o N_o}{N} \cdot \frac{V_1 - V_2}{L_1} \right), \tag{5}$$

$$v_{34} = (\mu E_{34}) = \left( \frac{\mu_o N_o}{N} \cdot \frac{V_1 - V_3}{L_2} \right), \tag{6}$$

$$v_{36} = (\mu E_{36}) = \left( \frac{\mu_o N_o}{N} \cdot \frac{V_2}{L_3} \right), \text{ and} \tag{7}$$

$$v_{38} = (\mu E_{38}) = \left( \frac{\mu_o N_o}{N} \cdot \frac{V_3}{L_4} \right). \tag{8}$$

where with reference to FIG. 1

$\mu$ is the mobility of the ions (cm$^2$/volt-second), $E_{xx}$ is the electric field in the indicated region (volts/cm), $\mu$ is the reduced mobility of the ions (cm$^2$/volt-second), $N_o$ is the gas density at standard conditions (particle/cm$^3$), $N$ is the ambient gas density (particle/cm$^3$), $V_x$ is the indicated voltage (volts), and $L_x$ is the indicated length (cm).

For the many practical gas flow conditions where the present invention is suitable for measuring flux, the reduced mobility of the ion $\mu$ o can be considered a constant. The measured electric currents $I_5$, $I_6$, $I_7$, and $I_8$ and the internal ion currents $I_1$, $I_2$, $I_3$ and $I_4$ are related by the equations $$I_5 = I_1 - I_3, \tag{9}$$

$$I_6 = I_2 - I_4, \tag{10}$$

$$I_7 = I_3 \tag{11}$$

and $$I_8 = I_4 \tag{12}$$

An expression for the rate of fluid flow which has very good accuracy is obtained in terms of the measurable currents and voltages through suitable manipulation of the relationships defined in Eq. (1)–(12).

This relation for flux is expressed as $$Nv_a A = K_1(V_2 + V_3) \left[ -\left( \frac{I_7 - I_8}{I_7 + I_8} \right) + \left( \frac{I_5 - I_6}{I_5 + I_6} \right) + K_2 \left( \frac{V_2 - V_3}{V_2 + V_3} \right) + K_3 \right] \tag{13}$$

where the coefficient $K_1$ is expressed as $$K_1 = \frac{\mu_o N_o A (I_5 + I_6)}{(L_3 + L_4) \left[ 1 - \left( \frac{V_2 + V_3}{2V_1 - V_2 - V_3} \cdot \frac{L_1 + L_2}{L_3 + L_4} \right) \right] (I_5 + I_6 + I_7 + I_8)} \tag{14}$$

The ratio of the collector current summation is a constant and the coefficient $K_1$ can be made virtually constant in practical embodiments by suitable electrical feedback control of the power sources 33, 35 so that the potentials $V_2$ and $V_3$ remain proportional to $V_1$.

Similarly, the second coefficient $K_2$ can also be expressed as a constant to very good accuracy as $$K_2 = \left[ \frac{I_5 + I_6 + I_7 + I_8}{I_5 + I_6} \right] \left[ \frac{2V_1}{2V_1 - V_2 - V_3} \right]. \quad (15)$$

The third coefficient $K_3$ is a measure of the mechanical inaccuracies of the apparatus and is a relatively small constant which can be described by $$K_3 = \left[ \left( \frac{L_1 - L_2}{L_1 + L_2} \right) - \left[ \left( \frac{L_3 - L_4}{L_3 + L_4} \right) \right] \right]$$

$$\left[ \frac{I_5 + I_6 + I_7 + I_8}{I_5 + I_6} \right]. \quad (16)$$

The flux can be readily computed from the currents and voltages as expressed in Eq. (13) with an integral electronic computer which is a part of an electronics unit 58 used to drive the voltages and various operational strategies can be used to reduce the complexity of the computations involved. One such strategy requires that the first collector current $I_5$ be equal to the second collector current $I_6$ in order to eliminate one computation in the expression for flux defined by Eq. (13). This mode of operation is identified as the constant current mode.

An alternate control strategy requires that the potentials $V_2$ and $V_3$ of the second and third power sources respectively be equal. These conditions result in a condition of constant drift field which causes a different term in the flux relationship of Eq. (13), to become zero.

Figure 2:
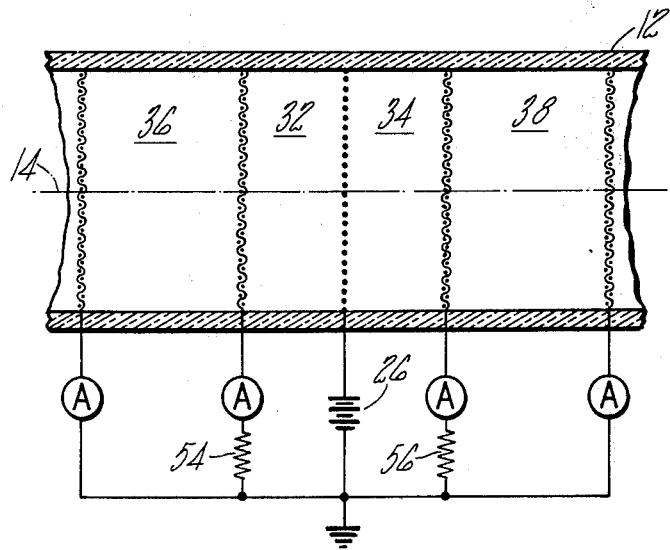
FIG. 2 is an alternate embodiment of the apparatus showing essentially the same structure with a different electrical arrangement of the ion collectors.

Still another control strategy involves a slightly modified circuitry as is shown in FIG. 2 in which the power sources 33, 35 are replaced by resistors 54, 56 respectively. The operation of this resistor biased apparatus results in the first collector being at $V_2$ due to the passage of current $I_5$ through the resistor 54 and the second collector being at $V_3$ due to the passage of current $I_6$ through the resistor 56. Replacement of the second and third power sources with resistors reduces the complexity and cost associated with the creation of the biasing potentials $V_2$ and $V_3$ which are defined as $$V_2 = (I_5 R_{54}) \quad (17)$$

and $$V_3 = (I_6 R_{56})$$

Incorporating these relationships in the expression for flux, Eq. (13) provides $$Nv_o A = K_4 \left[ -\frac{(I_7 - I_8)(I_5 + I_6)}{I_7 + I_8} + K_5(I_5 - I_6) \right.$$

$$\left. + K_6(I_5 + I_6 + I_7 + I_8) \right]. \quad (18)$$

The fourth coefficient $K_4$ which is expressed as $$K_4 = \frac{\mu_o N_o A(R_{54} + R_{56})(I_5 + I_6)}{2(L_3 + L_4) \left[ 1 - \frac{(V_2 + V_3)}{(2V_1 - V_2 - V_3)} \frac{(L_1 + L_2)}{(L_3 + L_4)} \right] [I_5 + I_6 + I_7 + I_8]}, \quad (19)$$

is essentially constant in most practical circumstances which include suitable feedback control of $I_5$ and $I_6$ to maintain $V_2$ and $V_3$ proportional to $V_1$.

The fifth coefficient $K_5$ can be made essentially constant in a practical apparatus and is related to the second coefficient $K_2$ as defined in Eq. (15) by $$K_5 = 1 + K_2, \quad (20)$$

and the sixth coefficient K is expressed as $$K_6 = \frac{L_1 - L_2}{L_1 + L_2} - \frac{L_3 - L_4}{L_3 + L_4} + \frac{R_{54} - R_{56}}{R_{54} + R_{56}}$$

$$\left( \frac{2V_1}{2V_1 - V_2 - V_3} \right). \quad (21)$$

In an actual embodiment of the present invention using only one power source and two resistors as is shown in FIG. 2, the potential $V_1$ is applied to the wire array 16 and with well known readily available electronic feedback control to the power source, the electric potentials of the first and second collectors, $V_2$ and $V_3$ respectively, are maintained proportional to $V_1$. Similarly, the sum of the third and fourth collector currents ($I_7$ and $I_8$) is maintained proportional to the sum of the first and second collector currents ($I_5$ and $I_6$) due to the symmetry and structure of the flux sensor. Also, in suitable applications, the presence of a dominant ionic species such as a hydrated proton in ambient air throughout the sensor region insures that the reduced mobility of the ions, $\mu_o$ remains constant. Under these circumstances the fourth coefficient is a constant and can be considered an adjustable scaling ratio correlating the relationship between the electronically computed flux and a calibrated flow rate of gas.

The first term within the brackets of Eq. (18) is the principal variable when the apparatus is used as a flux measurement instrument and this term may change over a dynamic range of one hundred or more. The second term contains the fifth coefficient and is a correction consideration which is typically small and frequently of nearly constant magnitude in many practical circumstances. The value of the fifth coefficient is evaluated from the measured values of the several currents and voltages in accordance with Eq. (20) and is a constant for a specific apparatus at the selected operating conditions. The third term is also a correction which contains the small but important sixth coefficient and includes terms which are not readily measurable. In a practical apparatus the value of the sixth coefficient is adjusted to set the computed flux to zero when the fluid in the duct is stationary.

Having established the value of the fifth coefficient, the value of the fourth coefficient is selected and the instrument is zeroed by adjustment of the sixth coefficient thereby allowing an electronic computation of the expression described in Eq. (18) with any one of a number of analog or digital circuits. Typically the apparatus and the associated electronics signal processing circuit are standardized against a calibrated flow rate of the fluid for which the application exists.

Figure 3:
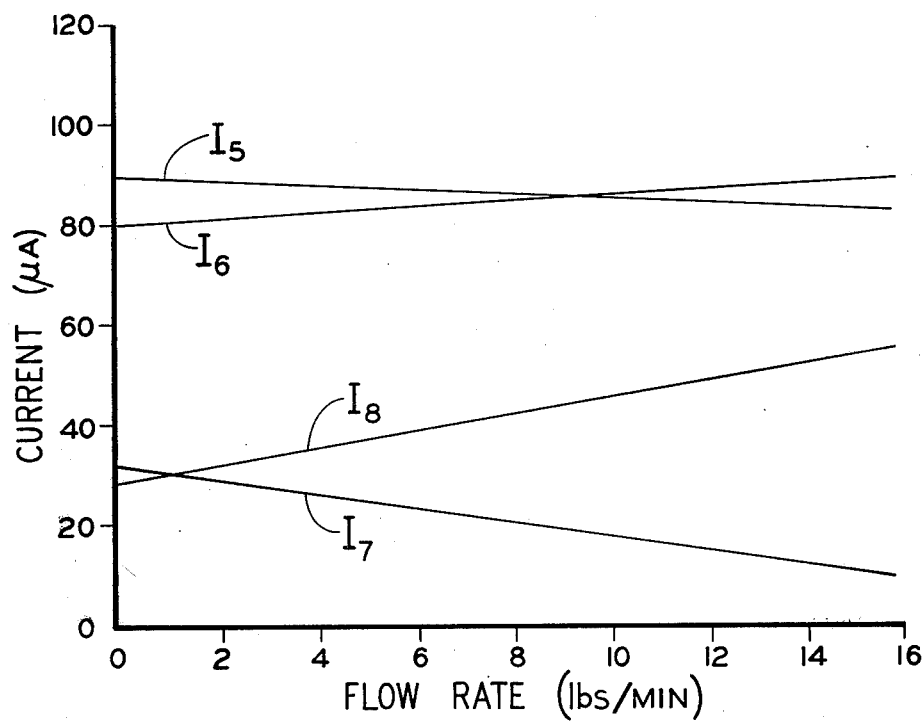
FIG. 3 is a plot showing the change in ion current in each of the collectors as a function of the mass flow rate of air through the embodiment shown in FIG. 1.

In a demonstration of a flux sensor of the type described hereinbefore and operated in a constant drift field mode of operation wherein the first and second collectors are maintained at the same voltage, the power source was maintained at 8400 volts and the intermediate power sources 33, 35 were maintained at 3800 volts. The first and second collectors were each separated from the wire array 16 by two tenths of an inch and the third and fourth collectors were each separated from the first and second collectors respectively by three eights of an inch. When the system was operated with air flowing through the duct over a range of essentially zero to 15 pounds per minute, the ion collector currents $I_5$, $I_6$, $I_7$, and $I_8$ plotted in FIG. 3 were observed. The graph illustrates that the first and second collector currents $I_5$, $I_6$ undergo approximately a 10 percent change in magnitude over the range of airflow shown. The graph illustrates also that the first and second collector currents were unequal under conditions of no airflow through the duct indicating an inequality in either, or both, the ion density in the upstream and downstream regions, or the separation distance between the wire array and the first and second collectors. The graph shows the change in the third and fourth collector currents $I_7$, $I_8$ as a function of air flow. These currents change with respect to air flow at a rate which is substantially higher than the corresponding change in the currents through the first and second collectors. This relationship was anticipated and is due to the relative magnitude of the electric fields in the regions 34, 32 immediately adjacent the wire screen 16 as contrasted with the electric fields in the far regions 36, 38.

Figure 4:
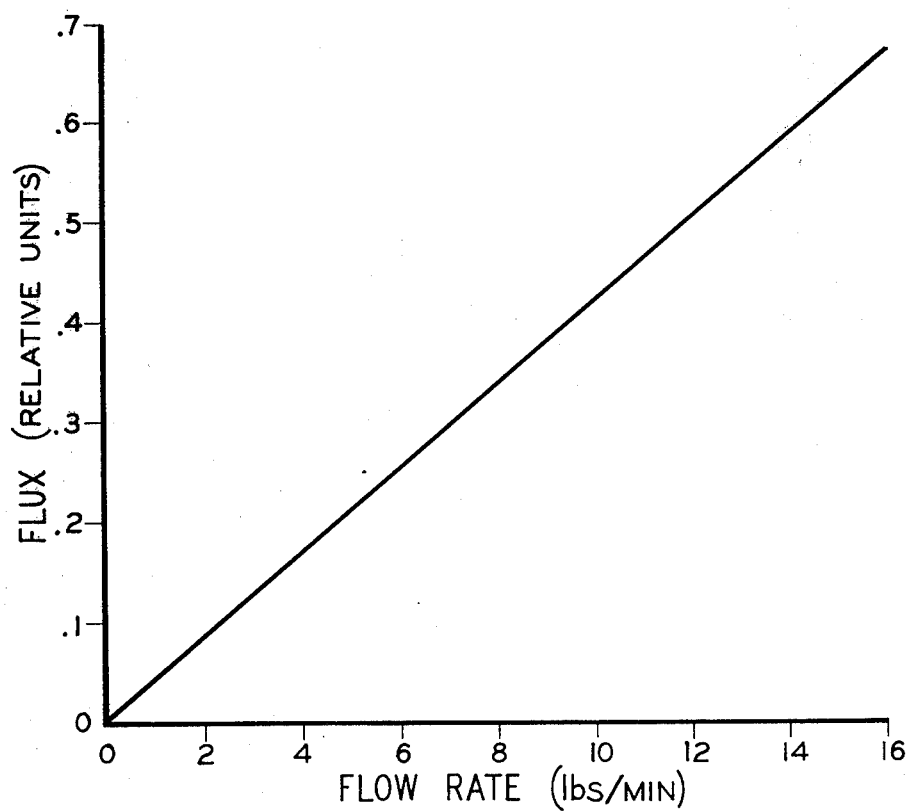
FIG. 4 is a plot of the computed flux as a function of the mass flow rate illustrating the calibration characteristics of the device shown in FIG. 1.

With suitable algebraic manipulation of the flux equation (Eq. 13), a graph showing the relationship between the flux computed from the measured currents and voltages and the independently calibrated airflow rate for the specific system previously described can be developed as is shown in FIG. 4. This calibration curve is characteristic of the specific flow meter for which it was derived and clearly demonstrates the applicability and accuracy of the disclosure provided herein relative to the four collector grid flux sensor.

Although the present invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention that which we claim as new and desire to secure by Letters Patent of the United States is:

1. Apparatus for determining the flux of a gas comprising:
   means for providing a region having an axis parallel to which the gas flows at a velocity $v_g$ in passing therethrough;
   charged particle source means extending essentially perpendicular to the flow axis to provide charged particles in the gas adjacent to the source means;
   first collection means separated from the charged particle source means by a distance $L_1$ and extending across the region essentially perpendicular to the flow axis to collect charged particles which drift from the charged particle source means along the flow axis in the direction opposite to the flow of the gas and form a first electric current;
   second collection means separated from the charged particle source means by a distance $L_2$ and extending across the region essentially perpendicular to the flow axis to collect charged particles which drift from the charged particle source means along the flow axis in the direction of flow of the gas and form a second electric current;
   third collection means separated from the first collection means by a distance $L_3$ and extending across the region essentially perpendicular to the flow axis to collect charged particles which drift from the first collection means along the flow axis in the direction opposite to the flow of the gas and form a third electric current;
   fourth collection means separated from the second collection means by a distance $L_4$ and extending across the region essentially perpendicular to the flow axis to collect charged particles which drift from the second collection means along the flow axis in the direction of flow of the gas and form a fourth electric current;
   means for providing an electric potential between the charged particle source means and the collection means to induce the charged particles to drift along the axis toward the collection means;
   means for sensing the first electric current;
   means for sensing the second electric current;
   means for sensing the third electric current; and
   means for sensing the fourth electric current.

2. The invention according to claim 1 wherein the region comprises the interior of a duct having a cross sectional area A.

3. The invention according to claim 2 including further
   means for sensing the electric potential of the charged particle source means;
   means for sensing the electric potential of the first collector; and
   means for sensing the electric potential of the second collector.

4. The invention according to claim 3 wherein the charged particles are positive ions.

5. The invention according to claim 4 wherein the collector separation distances $L_1$ and $L_2$ are equal and the collector separation distances $L_3$ and $L_4$ are equal.

6. The invention according to claim 5 wherein the gas is air.

7. The invention according to claim 5 including further,
   first resistor means in the path of the first electric current and located between the first collection means and electrical ground; and
   second resistor means in the path of the second electric current and located between the second collection means and electrical ground.

8. The invention according to claim 5 wherein the means for providing the electric potential comprises:
   a first power source capable of maintaining the charged particle source means at a first electric potential $V_1$;
   a second power source capable of maintaining the first collector at a second electric potential $V_2$ which is intermediate between the potantial $V_1$ and an electrical ground; and
   a third power source capable of maintaining the second collector at a third electric potential $V_3$ which is intermediate between the potential $V_1$ and an electrical ground.

9. The invention according to claim 8 including further means for processing the signals corresponding to the first, second, third and fourth electric currents and the first, second and third electric potentials to produce an output signal proportional to the flux of the gas passing through the conduit.

10. The method of measuring the flux of a gas including the steps of:

flowing the gas along an axis of a region which extends from an upstream location to a downstream location;

creating charged particles in the gas;

applying a first electric potential to establish along the flow axis an electric field which is substantially uniform and of known intensity and extends from the source of charged particles upstream to a first collector and downstream to a second collector;

applying a second electric potential to establish along the flow axis an electric field which is substantially uniform and of known intensity and extends upstream from the first collector to a third collector and downstream from the second collector to the fourth collector;

sensing the electric current in each of the four collectors;

sensing the electric potentials providing the electric fields, and converting the electric current and potential signals to an output signal which is representative of the fluid flux.

11. The invention according to claim 10 wherein the currents in the first and second collectors are each controlled to cause the electric potentials of the second power source and the third power source to be directly proportional to the electric potential of the first power source.

12. The invention according to claim 10 wherein the electric potential of both the first and second collectors is maintained equal at all times.

13. The invention according to claim 10 wherein the current in the first collector is maintained equal to the current in the second collector.

14. The method of measuring the flux of a gas including the steps of:

flowing the gas along an axis of a region which extends from an upstream location to a downstream location;

creating charged particles in the gas;

applying a first electric potential to establish along the flow axis an electric field which is substantially uniform and of known intensity and extends from the source of charged particles upstream to a first collector and downstream to a second collector;

maintaining the first and second collectors at an electric potential which is intermediate the potential of the source of charged particles and an electrical ground;

providing a third collector upstream of the first collector and a fourth collector downstream of the second collector;

sensing the electric current in each of the four collectors;

sensing the electric potentials providing the electric fields, and converting the electric current and potential signals to an output signal which is representative of the flux of a gas flowing through the duct.

* * * * *

UNITED STATES PATENT OFFICE
CERTIFICATE OF CORRECTION

PATENT NO. : 4,019,383
DATED : April 26, 1977
INVENTOR(S) : WALTER J. WIEGAND, JR. ET AL It is certified that error appears in the above-identified patent and that said Letters Patent are hereby corrected as shown below:

Column 6, line 18, after "$\mu$" insert -- ₒ --

Column 10, line 63 "potantial" should read -- potential --

Signed and Sealed this

Eighteenth Day of October 1977

[SEAL]

Attest:

RUTH C. MASON
Attesting Officer

LUTRELLE F. PARKER
Acting Commissioner of Patents and Trademarks